(12) United States Patent
De'Longhi et al.

(10) Patent No.: US 9,962,033 B2
(45) Date of Patent: May 8, 2018

(54) DEVICE ASSOCIABLE WITH A STEAM DISPENSING NOZZLE OF A COFFEE MACHINE FOR THE PRODUCTION OF A MILK-BASED BEVERAGE

(71) Applicant: De'Longhi Appliances S.R.L., Treviso (IT)

(72) Inventors: Giuseppe De'Longhi, Treviso (IT); Enrico Zaratin, Paese (IT); Francesca Certossi, Casier (IT)

(73) Assignee: DE'LONGHI APPLIANCES S.R.L., Treviso (IT)

( * ) Notice: Subject to any disclaimer, the term of this patent is extended or adjusted under 35 U.S.C. 154(b) by 619 days.

(21) Appl. No.: 14/596,282

(22) Filed: Jan. 14, 2015

(65) Prior Publication Data
US 2015/0196160 A1    Jul. 16, 2015

(30) Foreign Application Priority Data

Jan. 15, 2014  (IT) .............................. MI2014A0038

(51) Int. Cl.
*A47J 31/46* (2006.01)
*A47J 31/44* (2006.01)

(52) U.S. Cl.
CPC ......... *A47J 31/462* (2013.01); *A47J 31/4485* (2013.01); *A47J 31/4489* (2013.01); *A47J 31/4496* (2013.01)

(58) Field of Classification Search
CPC ................ A47J 31/4489; A47J 31/4485; A47J 31/4496; A47J 31/462

USPC ........................................................... 99/294
See application file for complete search history.

(56) References Cited

U.S. PATENT DOCUMENTS

| | | | | |
|---|---|---|---|---|
| 2,566,916 A | * | 9/1951 | Young | A47J 31/44 99/292 |
| 3,188,055 A | * | 6/1965 | Lutjens | A01C 23/042 137/599.01 |
| 3,270,918 A | * | 9/1966 | Goodrich | A47J 31/007 137/392 |
| 3,534,771 A | * | 10/1970 | Krohn | B65D 83/62 137/516.25 |
| 3,854,700 A | * | 12/1974 | MacManus | A47J 43/123 137/892 |
| 4,140,586 A | * | 2/1979 | Kwasnoski | B01D 1/14 203/10 |
| 4,277,311 A | * | 7/1981 | Kwasnoski | B01D 1/14 202/183 |
| 4,376,447 A | * | 3/1983 | Chumley | F16K 1/42 137/244 |
| 4,402,257 A | * | 9/1983 | Marotta | A47J 31/0576 99/295 |

(Continued)

*Primary Examiner* — Eric Stapleton
(74) *Attorney, Agent, or Firm* — Blank Rome LLP (57) ABSTRACT

A device associable with a steam dispensing nozzle of a coffee machine for the production of a milk-based beverage including a milk container fitted with a lid in which there is incorporated a mixing device having a mixing chamber a channel for the inflow of steam into the mixing chamber, a channel for the inflow of milk into the mixing chamber, a channel for the inflow of air into the mixing chamber, and a channel for dispensing the beverage produced in the mixing chamber. The air inflow channel, the milk inflow channel, the steam inflow channel and the dispensing channel can be made in one piece of elastically deformable rubber.

13 Claims, 5 Drawing Sheets

(56) References Cited

U.S. PATENT DOCUMENTS

| | | | | |
|---|---|---|---|---|
| 4,508,023 A | * | 4/1985 | Naya | A47J 31/0573 392/467 |
| 4,520,948 A | * | 6/1985 | Hampel | B65D 77/067 137/844 |
| 4,715,274 A | * | 12/1987 | Paoletti | A47J 31/4485 239/113 |
| 4,779,519 A | * | 10/1988 | Giuliano | A47J 31/24 137/889 |
| 4,800,805 A | * | 1/1989 | Mahlich | A47J 31/4489 261/121.1 |
| 4,945,824 A | * | 8/1990 | Borgmann | A47J 31/4489 261/121.1 |
| 4,949,631 A | * | 8/1990 | Fregnan | A47J 31/4485 261/DIG. 26 |
| 5,058,195 A | * | 10/1991 | Knepler | A47J 31/56 338/22 R |
| 5,207,148 A | * | 5/1993 | Anderson | A47J 31/36 137/893 |
| 5,219,455 A | * | 6/1993 | Trucco | A23G 9/20 366/182.2 |
| 5,299,491 A | * | 4/1994 | Kawada | A47J 31/408 99/289 T |
| 5,372,061 A | * | 12/1994 | Albert | A47J 31/46 99/281 |
| 5,423,245 A | * | 6/1995 | Midden | A47J 31/4485 239/445 |
| 5,434,392 A | * | 7/1995 | Belinkoff | A47J 31/547 219/689 |
| 5,490,447 A | * | 2/1996 | Giuliano | A47J 31/3614 99/286 |
| 5,549,036 A | * | 8/1996 | Hourizadeh | A47J 31/4485 99/286 |
| 5,623,864 A | * | 4/1997 | Moore | A47J 31/0615 426/433 |
| 5,638,740 A | * | 6/1997 | Cai | A47J 31/0657 261/126 |
| 5,638,991 A | * | 6/1997 | Todden | B67D 1/0006 222/113 |
| 5,855,162 A | * | 1/1999 | Bauer | A47J 31/4485 222/566 |
| 6,006,654 A | * | 12/1999 | Pugh | A47J 31/4485 261/DIG. 76 |
| 6,019,032 A | * | 2/2000 | Arksey | A47J 31/24 261/DIG. 16 |
| 6,158,328 A | * | 12/2000 | Cai | A47J 31/4485 261/DIG. 76 |
| 6,170,387 B1 | * | 1/2001 | Cheung | A47J 31/0576 99/283 |
| 6,722,264 B2 | * | 4/2004 | Takatsuki | A47J 31/4432 99/279 |
| 6,758,130 B2 | * | 7/2004 | Sargent | A23F 3/14 426/115 |
| 6,929,033 B2 | * | 8/2005 | Sekiguchi | B01F 5/0413 137/599.12 |
| 7,021,206 B2 | * | 4/2006 | Eckenhausen | A47J 31/4485 261/66 |
| 7,069,843 B2 | * | 7/2006 | Paoletti | A47J 31/4485 99/275 |
| 7,318,374 B2 | * | 1/2008 | Guerrero | A47J 31/0626 99/321 |
| 7,322,275 B2 | * | 1/2008 | Lussi | A47J 31/46 99/281 |
| 7,461,587 B2 | * | 12/2008 | Guerrero | A47J 31/02 210/474 |
| 8,053,012 B2 | * | 11/2011 | Navarini | A47J 31/002 426/433 |
| 8,708,856 B2 | * | 4/2014 | Shin | F16H 29/04 475/16 |
| 8,770,099 B2 | * | 7/2014 | Reyhanloo | A47J 31/4485 134/22.12 |
| 8,794,128 B2 | * | 8/2014 | Fraij | A47J 31/4485 99/290 |
| 8,833,238 B2 | * | 9/2014 | Hansen | A47J 31/3695 99/283 |
| 8,931,399 B2 | * | 1/2015 | Buttiker | A47J 31/36 426/433 |
| 9,247,845 B2 | * | 2/2016 | Blanc | A47J 31/3623 |
| 9,259,116 B2 | * | 2/2016 | Hiron | A47J 31/0663 |
| 9,408,494 B2 | * | 8/2016 | Douma | A47J 31/4485 |
| 2001/0022138 A1 | * | 9/2001 | Schmed | A47J 31/0605 99/299 |
| 2002/0035929 A1 | * | 3/2002 | Kanba | A47J 31/0605 99/279 |
| 2002/0174775 A1 | * | 11/2002 | Takatsuki | A47L 9/14 96/416 |
| 2003/0056661 A1 | * | 3/2003 | Hu | A47J 31/0668 99/495 |
| 2003/0232115 A1 | * | 12/2003 | Eckenhausen | A47J 31/4485 426/477 |
| 2004/0025703 A1 | * | 2/2004 | Ming | A47J 31/42 99/286 |
| 2004/0187694 A1 | * | 9/2004 | Cai | A47J 31/0668 99/275 |
| 2005/0223911 A1 | * | 10/2005 | Landolt | A47J 31/4485 99/455 |
| 2005/0247204 A1 | * | 11/2005 | Lafond | A47J 31/36 99/279 |
| 2007/0012193 A1 | * | 1/2007 | Oehninger | A47J 31/46 99/279 |
| 2007/0048428 A1 | * | 3/2007 | Green | A47J 31/4485 426/564 |
| 2007/0158366 A1 | * | 7/2007 | Van Deer Meer | A47J 31/4485 222/222 |
| 2007/0243305 A1 | * | 10/2007 | Marconi | A47J 31/4485 426/596 |
| 2009/0095165 A1 | * | 4/2009 | Nosler | A47J 31/007 99/289 R |
| 2009/0133584 A1 | * | 5/2009 | De Graaff | A47J 31/405 99/279 |
| 2009/0223376 A1 | * | 9/2009 | Navarini | A47J 31/303 99/293 |
| 2009/0293733 A1 | * | 12/2009 | Martin | A47J 31/60 99/280 |
| 2010/0107891 A1 | * | 5/2010 | Vanderstegen-Drake | A47J 31/4485 99/323.1 |
| 2010/0147154 A1 | * | 6/2010 | De Graaff | A47J 31/405 99/279 |
| 2010/0186851 A1 | * | 7/2010 | Rusch | B67D 1/0004 141/383 |
| 2010/0239728 A1 | * | 9/2010 | De Graaff | A47J 31/407 426/389 |
| 2010/0326430 A1 | * | 12/2010 | Deng | F16K 11/0836 126/85 R |
| 2011/0036244 A1 | * | 2/2011 | Chatterjee | A47J 31/3642 99/283 |
| 2011/0072977 A1 | * | 3/2011 | Mahlich | A47J 31/4485 99/280 |
| 2011/0100230 A1 | * | 5/2011 | Cheng | A47J 31/4485 99/293 |
| 2011/0111109 A1 | * | 5/2011 | Fischer | A47J 31/4489 426/474 |
| 2011/0143294 A1 | * | 6/2011 | Deng | F23D 17/002 431/279 |
| 2011/0305807 A1 | * | 12/2011 | Koeling | A47J 31/407 426/431 |
| 2012/0085241 A1 | * | 4/2012 | Krug | A47J 31/4403 99/289 R |
| 2012/0104038 A1 | * | 5/2012 | Quaratesi | A47J 31/4489 99/277.2 |
| 2012/0118164 A1 | * | 5/2012 | Tonelli | A47J 31/4485 99/280 |
| 2012/0156336 A1 | * | 6/2012 | Hansen | A47J 31/0605 426/231 |
| 2012/0164295 A1 | * | 6/2012 | Hansen | A47J 31/0605 426/474 |
| 2012/0222561 A1 | * | 9/2012 | Tonelli | A47J 31/4485 99/293 |

(56) References Cited

U.S. PATENT DOCUMENTS

| | | | |
|---|---|---|---|
| 2013/0145936 A1* | 6/2013 | Dollner | A47J 31/4485 99/293 |
| 2013/0319259 A1* | 12/2013 | Ait Bouziad | A47J 31/4485 99/453 |
| 2014/0044847 A1* | 2/2014 | Hellmaier | A47J 31/4485 426/474 |

* cited by examiner

DEVICE ASSOCIABLE WITH A STEAM DISPENSING NOZZLE OF A COFFEE MACHINE FOR THE PRODUCTION OF A MILK-BASED BEVERAGE

RELATED APPLICATIONS

This application claims benefit of priority under 35 USC § 119 of Italy Patent Application No. MI2014A 000038, filed Jan. 15, 2014, entitled "Device Associable with a Steam Dispensing Nozzle of a Coffee Machine for the Production of a Milk-Based Beverage," which application is incorporated herein by reference.

FIELD OF THE INVENTION

The present invention relates to a device associable with a steam dispensing nozzle of a coffee machine for the production of a milk-based beverage.

BACKGROUND OF THE INVENTION

Such a device is intended to produce a cappuccino, or also coffee and milk without foam, or hot milk with or without foam.

A device of this type is often marked by a considerable difficulty of access to all of its constituent internal parts for inspection and cleaning.

Correct cleaning of internal parts is fundamental to ensure both the proper hygienic conditions and the correct functioning of the device.

It should in fact be highlighted that milk encrustations and dirty residues can not only provoke the emission of unpleasant odours and the proliferation of germs, but also create distortions in the operating parameters of the device.

For example, encrustations can at least partially undermine the correct functioning of the system for regulating the intake of air and/or of the Venturi system which causes milk and air to be drawn into the mixing chamber when the vapour flow is activated.

The technical task that the present invention sets itself is thus to provide a device associable with a steam dispensing nozzle of a coffee machine for the production of a milk-based beverage device which enables the aforementioned technical drawbacks of the prior art to be overcome.

SUMMARY OF THE INVENTION

Such a device generally comprises a milk container fitted with a lid incorporating a mixing device, which in turn comprises a mixing chamber, a channel for the inflow of steam into the mixing chamber, a channel for the inflow of milk into the mixing chamber, a channel for the inflow of air into the mixing chamber, said channel having a device for adjusting the size of the passage opening thereof, and a channel for dispensing the beverage produced in the mixing chamber.

Within the scope of this technical task, one object of the invention is to provide a device associable with a steam dispensing nozzle of a coffee machine for the production of a milk-based beverage in which all the internal parts are easily accessible for inspection and cleaning.

Another object of the present invention is to provide a device associable with a steam dispensing nozzle of a coffee machine for the production of a milk-based beverage which maintains a high standard of performance over a long period of time.

The technical task, as well as these and other objects, are achieved according to the present invention by providing a device associable with a steam dispensing nozzle of a coffee machine for the production of a milk-based beverage which comprises a milk container fitted with a lid incorporating a mixing device which comprises a mixing chamber, a channel for the inflow of steam into the mixing chamber, a channel for the inflow of milk into the mixing chamber, a channel for the inflow of air into the mixing chamber, and a channel for dispensing the beverage produced in the mixing chamber, characterized in that said air inflow channel, said milk inflow channel, said steam inflow channel and said dispensing channel are made in one piece of elastically deformable rubber.

Advantageously, the dispensing channel is adjustable by deformation from an angular position adjacent to the container to an angular position suitable for direct dispensing into a cup.

Preferably, the lid has a first portion, in which a first part of the mixing device is incorporated and at least a second portion, separated from said first portion, in which at least a second part of the mixing device is incorporated, said lid assuming a configuration of coupling between said first and second portions, in which the mixing device is assembled, and a configuration of decoupling between said first and second portions, in which the mixing device is disassembled.

This construction of the device enables convenient access to the internal parts of the lid and the internal parts of the mixing device, and even to the inside of the mixing chamber and of the channels connected to it.

Correct and complete cleaning can thus be carried out directly by the user without any particular ability being necessary.

Other features of the present invention are defined, moreover, in the subsequent claims.

BRIEF DESCRIPTION OF THE DRAWINGS

Additional features and advantages of the invention will be more apparent from the description of a preferred, but not exclusive embodiment of the device associable with a steam dispensing nozzle of a coffee machine for the production of a milk-based beverage according to the invention, illustrated by way of non-limiting example in the appended drawings, in which.

DETAILED DESCRIPTION OF THE ILLUSTRATED EMBODIMENTS

With reference to the above-mentioned figures, there is shown a device 1 associable with a steam dispensing nozzle 2 of an automatic coffee machine 3 for the production of a milk-based beverage.

The device 1 comprises a milk container 4 fitted with a lid 5 in which there is incorporated a mixing device comprising a mixing chamber 6, a channel 7 for the inflow of steam into the mixing chamber 6, a channel 8 for the inflow of milk into the mixing chamber 6, a channel 9 for the inflow of air into the mixing chamber 6, and a channel 10 for dispensing the beverage produced in the mixing chamber 6.

The mixing device likewise comprises a device 11 for adjusting the size of the passage opening of the air channel 9.

The lid 5 has a first portion 5a in which there is incorporated a first part of the mixing device and at least a second portion 5b, separated from the first portion 5a, in which there is incorporated at least a second part of the mixing device.

The first portion 5a of the lid 5 has a perimeter profile 13 whereby it can be directly and removably fitted to the mouth 12 of the container 4, whereas the second portion 5b of the lid 5 is directly supported by the first lid portion 5a.

The first portion 5a of the lid 5 and the second portion 5b of the lid 5 are reciprocally connected along a hinge axis 26.

The hinge axis 26 extends outside the mixing device.

In particular, the hinge axis 26 is positioned on the side of the lid 5 opposite the one in which the steam dispensing nozzle 2 is inserted.

The hinge axis 26 is preferably oriented parallel to the rest surface of the milk container 4 and perpendicular to the axis of the steam inflow channel 7, the latter in turn also being oriented parallel to rest surface of the milk container 4.

Advantageously, the lid 5 has a variable configuration, being able to assume a configuration of coupling between the first lid portion 5a and the second portion 5b, in which the mixing device is assembled, and a configuration of decoupling between the first lid portion 5a and the second lid portion 5b, in which the mixing device is disassembled.

The wall 6a, 6b of the mixing chamber 6 has a first wall part 6a incorporated in the first lid portion 5a and a second wall part 6b incorporated in the second lid portion 5b.

The second wall part 6b has a profile 6b' engageable with a profile of a mating shape 6a' of the first wall part 6a.

In the configuration of decoupling between the first lid portion 5a and the second portion 5b, the profile 6b' is disengaged from the profile 6a' and the mixing chamber 6 is consequently open, that is to say, separated into two parts spaced apart from each other.

In the configuration of coupling between the first lid portion 5a and the second portion 5b, on the other hand, the profile 6b' is engaged with the profile 6a' and the mixing chamber 6 is consequently whole.

The air inflow channel 9, milk inflow channel 8, steam inflow channel 7 and dispensing channel 10 are incorporated in the first portion 5a of the lid 5.

In particular, the air inflow channel 9, milk inflow channel 8, steam inflow channel 7 and dispensing channel 10 are made in one piece together with the first wall part 6a' of the mixing chamber 6.

Preferably, the piece comprising the air inflow channel 9, milk inflow channel 8, steam inflow channel 7, dispensing channel 10 and the first wall part 6a' of the mixing chamber 6 is made of elastically deformable rubber.

The rubber, in particular, is of the silicone type.

Inside the mixing chamber 6 there is also a partition 14 provided with a calibrated hole 15, with which the steam dispensing nozzle 2 can be aligned.

The partition 14 divides the mixing chamber 6 into a premixing chamber 17, where the steam inflow channel 7, milk inflow channel 8 and air inflow channel 9 converge, and a chamber 18 for completing the mixing, from which the dispensing channel 10 branches off.

The partition 14, in particular, is also made in one piece together with the air inflow channel 9, milk inflow channel 8, steam inflow channel 7, dispensing channel 10 and first wall part 6a of the mixing chamber 6.

The second wall part 6b of the mixing chamber 6 represents a part of the wall of the chamber 18 for completing the mixing.

The pre-mixing volume, defined by the space of the pre-mixing chamber 17 that remains once the steam dispensing nozzle 2 has been introduced into the steam inflow channel 7, has a configuration such as to generate, by virtue of the Venturi effect, a negative pressure in the flow of steam dispensed by the nozzle 2, thanks to which milk is drawn from the milk channel 8 and air is drawn from the air channel 9.

To enable milk to be drawn into the milk container 4, an intake tube 22 is positioned therein; it extends all the way to the bottom of the milk container 4 and is connected to the milk inflow channel 8.

The dispensing channel 10, thanks to its intrinsic flexibility, can vary the dispensing direction.

For this purpose, the dispensing channel 10 is housed in a rigid tubular support 23 pivoted on the first portion 5a of the lid 5 by means of a pin 24.

The support 23 can be locked in various angular positions associated with different dispensing directions of the dispensing channel 10.

The support 23 has telescopically associated with it a tubular extension 25 extendable over the extension of the dispensing channel 10 to enable the dispensing to be adapted to cups of a different height.

Figure 5:
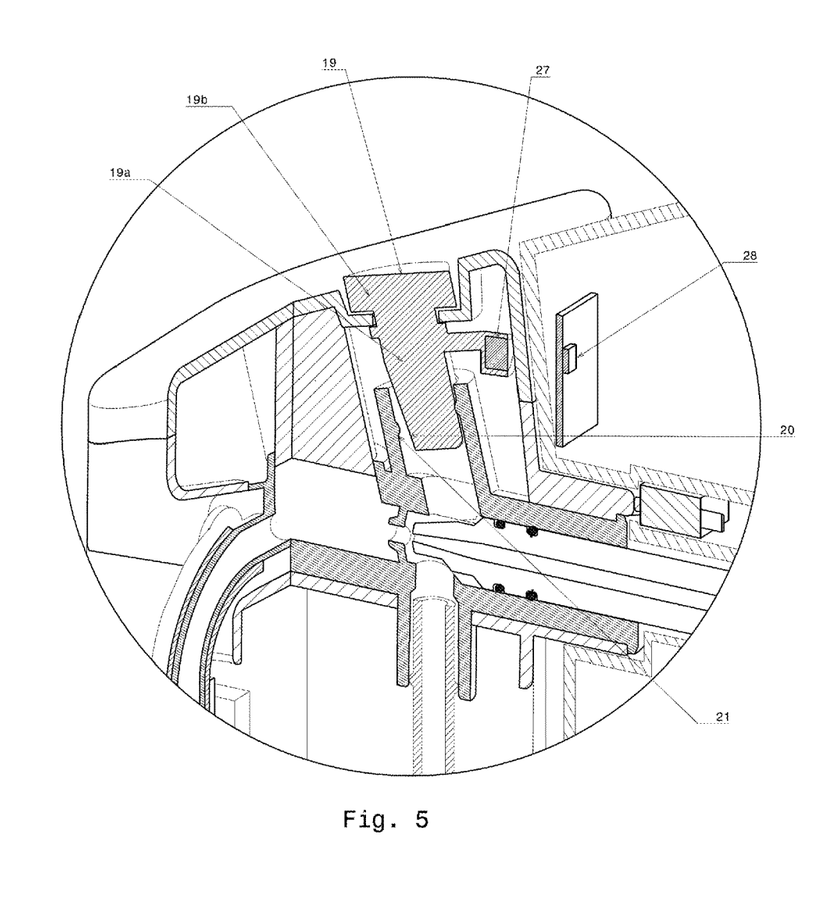
FIG. 5 shows a detail of the device for adjusting the size of the air passage opening of the device of FIG. 1.
Figure 6:
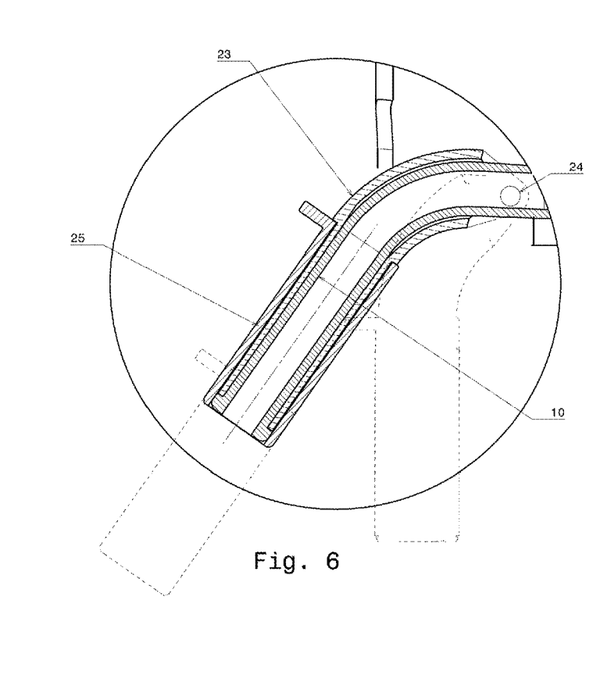
FIG. 6 shows a detail of the dispensing zone of the device of FIG. 1.

The device 11 for adjusting the size of the passage opening of the air inflow channel 9 comprises a shutter 19 incorporated in the second lid portion 5b.

The shutter 19 has a stem 19a which extends from the inner side of the second lid portion 5b and an adjustment knob 19b positioned on the outer side of the second lid portion 5b.

The second lid portion 5b supports the shutter 19 in such a way that it is rotatable about itself.

The shutter 19 is of a mating shape such as to be engageable by friction in the air inflow channel 9.

The stem 19a of the shutter 19 is completely extracted from the air inflow channel 9 in the configuration of decoupling between the first portion 5a of the lid 5 and the second portion 5b of the lid 5, and inserted in the air inflow channel 9 in the configuration of coupling between the first portion 5a of the lid 5 and the second portion 5b of the lid 5.

The stem 19a has a conical groove 20 which extends in an axial direction.

The air inflow channel 9 has on its inner side a sealing lip 21, which extends with an inclination relative to the axis of the air inflow channel 9 itself.

By virtue of the rotation of the stem 19a, the sealing lip 21 can thus be aligned with sections of the conical groove 20 of varying width. By turning the knob 19b, the size of the opening for the passage of air into the air inflow channel 9 can thus be adjusted in a continuous fashion from a maximum value corresponding to alignment of the sealing lip 21 with the base section of the conical groove 20 to a value of zero defined by the alignment of the sealing lip 21 with the top of the conical groove 20.

The adjustment knob 19b also has associated with it the function of selecting an internal flushing cycle of the mixing device.

For this purpose, fixed to the knob 19*b* there is a magnet 27 intended to interact with a magnetic sensor 28 specially provided on the coffee machine 3.

The flushing cycle is activated when the knob 19*b* is brought into an angular position in which the magnet 27, on coming face to face with the magnetic sensor 28, is detected by the latter, with the consequent generation of a flushing cycle activation signal that is sent to the control unit of the coffee machine 3.

The first portion 5*a* of the lid 5 has a tubular formation 29 which circumscribes the steam inflow channel 7.

The tubular formation 29 has the function of stiffening the steam inflow channel 7.

The tubular formation 29 also has a probe member 32 for activating a microswitch 33 positioned in the coffee machine 3.

When the steam inflow channel 7 is connected correctly to the steam dispensing nozzle 2 of the coffee machine 3, the microswitch 33, being on the trajectory of the probe member 32, is activated so as to generate a signal of the presence of the device 1, which is sent to the control unit of the coffee machine 3.

The control unit of the coffee machine 3 enables the dispensing of a flow of steam from the nozzle 2 either for the production of the beverage, or for internal flushing of the mixing device only in the event that the microswitch 33 has signalled the presence of the device 1.

Figure 1:
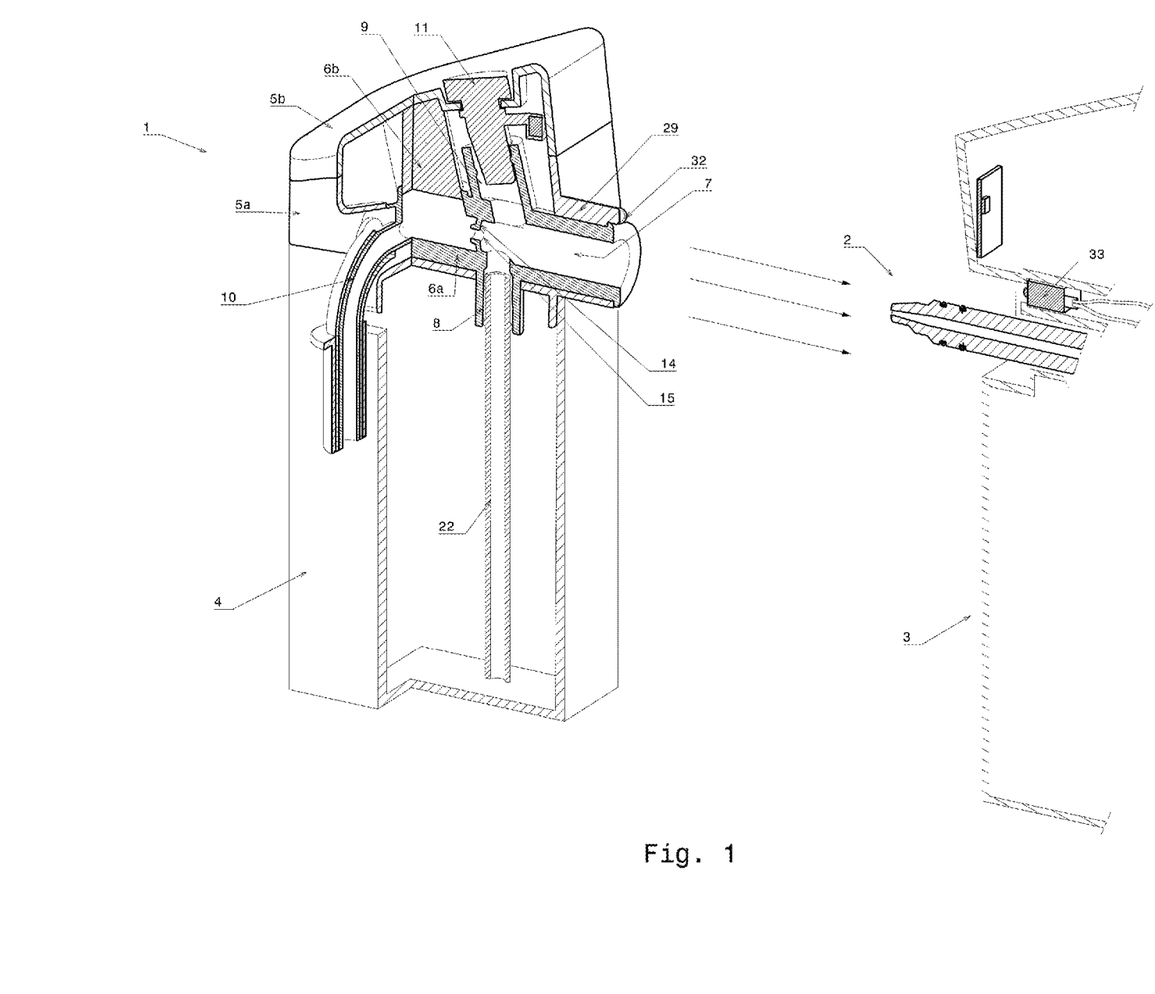
FIG. 1 shows a sectional view of the device disconnected from the steam dispensing nozzle of the coffee machine.
Figure 2:
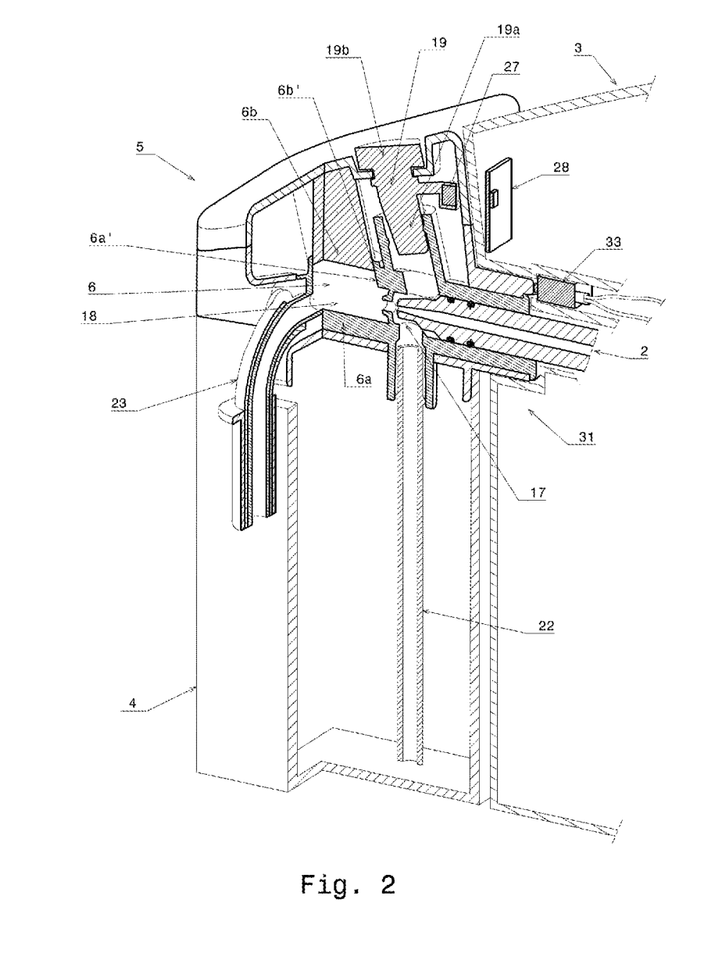
FIG. 2 shows the device of FIG. 1 connected to the steam dispensing nozzle of the coffee machine.
Figure 3:
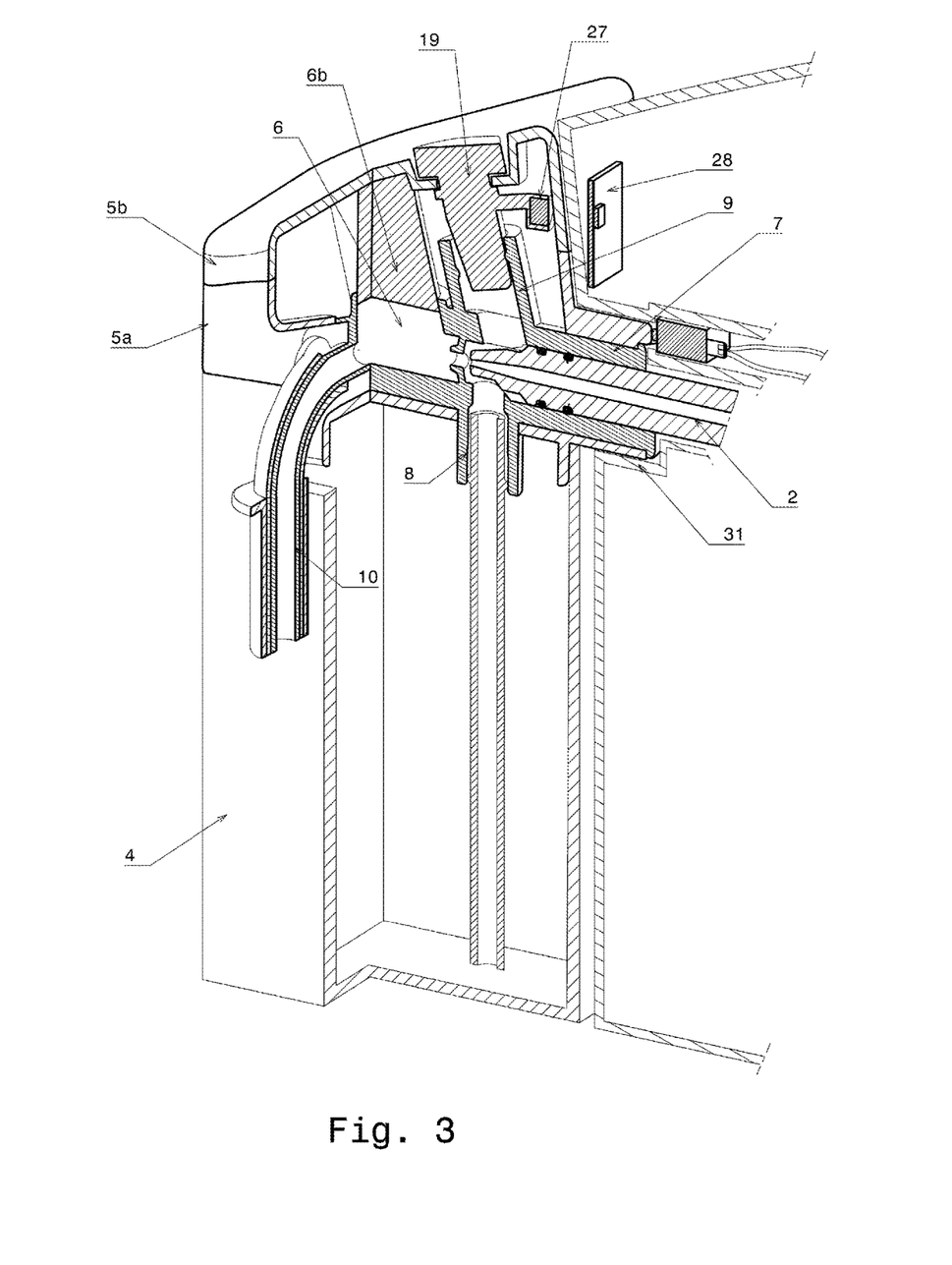
FIG. 3 shows the device of FIG. 1 connected to the steam dispensing nozzle of the coffee machine during operation, which is schematically illustrated with directional arrows indicating the inflows of steam, air and milk into the mixing chamber and the flow of the dispensed liquid.

The operation of the device 1 is briefly as follows.

The device 1 is associated with the coffee machine 4 by connecting the steam inflow channel 7 to the nozzle 2.

The microswitch 33 is activated by the probe member 32 and consequently enables the coffee machine 3 to deliver steam to the device 1 by means of the nozzle 2.

By acting on the adjustment knob 19*b*, the user sets the required degree of foam, which is directly proportional to the size of the passage opening of the air channel 9, and then presses the pushbutton on the coffee machine 3, which starts production of the beverage.

In the pre-mixing zone 17, thanks to the Venturi effect, a negative pressure is created in the flow of steam, whereby the milk and air are sucked into the pre-mixing zone 17.

Mixing continues in the zone 18. The dispensing channel 10 is in a position offset from the calibrated hole 15. The incoming flow from the calibrated hole 15 is therefore directly aimed against the inner wall of the mixing chamber 6. The impact of the flow against the inner wall of the mixing chamber 6 serves expressly to create a turbulence which improves the mixing.

After preparing the beverage, the user can select the automatic flushing cycle by acting on the adjustment knob 19*b*.

Figure 4:
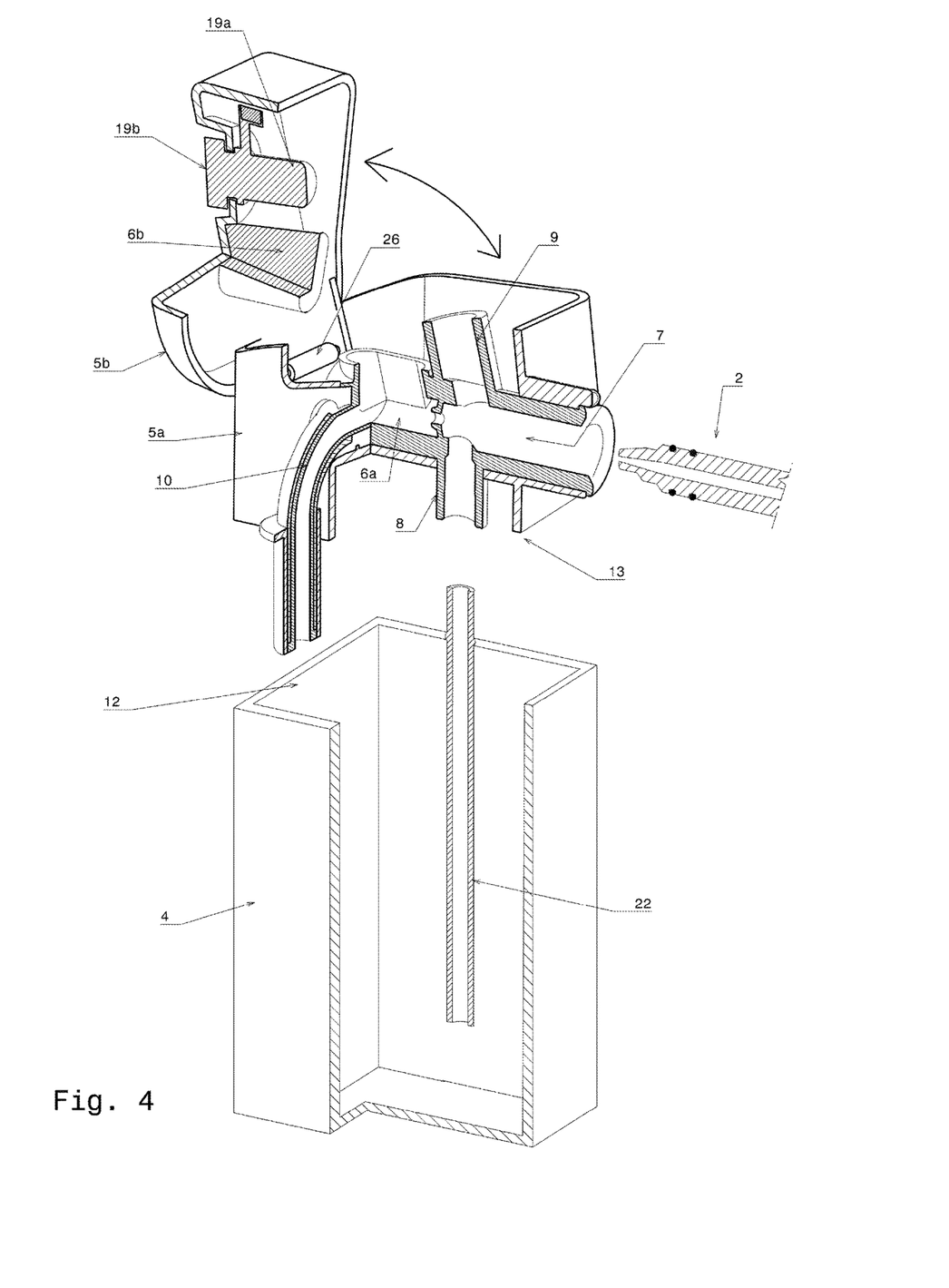
FIG. 4 shows the device of FIG. 1 with the lid open and removed from the milk container.

A complete cleaning of the device 1 can be carried out by the user, who initially removes it from the coffee machine 3.

Subsequently, the user removes the lid 5 from the container 4 and opens the lid 5 by rotating the second portion 5*b* relative to the first portion 5*a*.

The open lid 5 enables easy, direct access to the inside of the mixing chamber 6 and to the inside of the air inflow channel 9, which are the most critical points for cleaning.

In the open configuration, the lid 5 can optionally also be washed in a dishwasher.

The device associable with a steam dispensing nozzle of a coffee machine for the production of a milk-based beverage thus conceived is susceptible of numerous modifications and variants, all falling within the scope of the inventive concept; moreover, all of the details can be replaced with technically equivalent elements.

In practice, all of the materials used, as well as the dimensions, can be any whatsoever according to need and the state of the art.

What is claimed is:

1. A device associable with a steam dispensing nozzle of a coffee machine for the production of a milk-based beverage, comprising:
    a milk container fitted with a lid, in which there is incorporated a mixing device comprising:
    a mixing chamber;
    a steam inflow channel for the inflow of steam into the mixing chamber;
    a milk inflow channel for the inflow of milk into the mixing chamber;
    an air inflow channel for the inflow of air into the mixing chamber; and
    a dispensing channel for dispensing the beverage produced in the mixing chamber;
    wherein said air inflow channel, said milk inflow channel, said steam inflow channel and said dispensing channel are made in one piece of elastically deformable rubber; and
    wherein said lid has a first portion in which there is incorporated a first part of the mixing device, and at least a second portion, separated from said first portion, in which there is incorporated at least a second part of the mixing device, said lid having a configuration of coupling between said first and said second portions, wherein the mixing device is assembled, and a configuration of decoupling between said first and second portions, wherein the mixing device is disassembled.

2. The device of claim 1, wherein said dispensing channel is adjustable by deformation from an angular position adjacent to the milk container to an angular position of direct dispensing into a cup.

3. The device of claim 1, wherein a wall of the mixing chamber has a first wall part incorporated in the first portion of the lid, and a second wall part incorporated in the second portion of the lid.

4. The device of claim 3, wherein, when in said decoupling configuration said mixing chamber is open.

5. The device of claim 3, wherein said air inflow channel, said milk inflow channel, said steam inflow channel, and said dispensing channel are integrated with said first wall part of the mixing chamber.

6. The device of claim 1, wherein said air inflow channel includes an adjustment device for adjusting a size of a passage opening thereof, the adjustment device comprising a shutter provided with an adjustment knob incorporated in the second portion of the lid, said air inflow channel being incorporated in the first portion of the lid.

7. The device of claim 6, wherein said shutter is of a mating shape engageable by friction in said air inflow channel.

8. The device of claim 6, wherein, when in said decoupling configuration said shutter is completely extracted from said air inflow channel.

9. The device of claim 1, further comprising a partition inside said mixing chamber, said partition having a calibrated hole dividing the mixing chamber into a premixing chamber, where the steam inflow channel, the milk inflow channel, and the air inflow channel converge, and a chamber for completing the mixing, from which said dispensing channel branches off.

10. The device of claim 1, further comprising an axis of reciprocal hinging between said first and said second portions of the lid.

11. The device of claim 10, wherein said axis of reciprocal hinging extends outside the mixing device.

12. The device of claim 1, wherein said first portion of the lid has a perimeter profile for fitting into a mouth of the milk container.

13. A coffee machine comprising a device associable with a steam dispensing nozzle for the production of a milk-based beverage according to claim 1.

* * * * *